United States Patent [19]
Westermeyer

[11] Patent Number: 5,542,499
[45] Date of Patent: Aug. 6, 1996

[54] ELECTROMECHANICAL OIL LEVEL REGULATOR

[75] Inventor: Gary W. Westermeyer, Bluffs, Ill.

[73] Assignee: AC&R Components, Inc., Chatham, Ill.

[21] Appl. No.: 371,279

[22] Filed: Jan. 11, 1995

[51] Int. Cl.$^6$ .................................................. F01M 11/12
[52] U.S. Cl. ........................ 184/103.2; 184/108; 184/92; 137/412; 137/426
[58] Field of Search ............................ 184/103.1, 103.2, 184/108, 96; 137/412, 426

[56] References Cited

U.S. PATENT DOCUMENTS

| 347,589 | 8/1886 | Ghegan | 137/412 |
|---|---|---|---|
| 1,017,189 | 2/1912 | Turnage | 184/103.2 |
| 1,883,202 | 10/1932 | White | 184/103.2 |
| 2,246,244 | 6/1941 | Consley | |
| 4,182,364 | 1/1980 | Gilbert et al. | 137/426 |
| 4,428,208 | 1/1984 | Krause | |
| 4,967,880 | 11/1990 | Krambs | 184/103.2 |
| 5,056,622 | 10/1991 | Vermeulen | 184/6.4 |
| 5,327,997 | 7/1994 | Nash, Jr. et al. | 184/103.2 |
| 5,368,400 | 11/1994 | Cyphert et al. | 400/124.01 |

OTHER PUBLICATIONS

B/W Unifloat® Liquid Level Control Sys Dec. 1976 pp. 1–2.

Primary Examiner—Thomas E. Denion
Attorney, Agent, or Firm—Hill, Steadman & Simpson

[57] ABSTRACT

An oil level regulator is provided for controlling the oil level in the crankcase of one or more refrigeration compressors or the like. The regulator has a closed chamber for containing the oil. A float-controlled switch is operable to actuate a solenoid valve for introducing liquid into the chamber as necessary to maintain the oil level in the chamber and compressor crankcases.

19 Claims, 5 Drawing Sheets

ELECTROMECHANICAL OIL LEVEL REGULATOR

BACKGROUND OF THE INVENTION

The present invention generally relates to a fluid level regulator. More particularly, the present invention relates to an oil level regulator for controlling the oil level in a compressor crankcase.

Mechanical oil level control systems and regulators are generally known for controlling the oil level in a compressor crankcase. For example, U.S. Pat. No. 2,246,244 discloses a prior oil level control system for a refrigeration compressor. An oil level regulator is desirably capable of adjusting the oil level of the associated crankcase within predetermined oil level limits. The oil regulator disclosed in the aforementioned patent is not adjustable.

Adjustable mechanical regulators are generally known. U.S. Pat. No. 4,428,208, incorporated herein in its entirety, relates to such a device. That device includes a float which is connected at its side to a pivotable lever. Responsive to the oil level, the float travels along an arc, the float motion being constrained by the attached lever. The lever is operable to open or close a valve to control a flow of oil through an inlet. The inlet includes a vertically adjustable piston to which the valve, lever and float assembly are attached. This assembly is adjustable with a separate adjustment pin which extends vertically through the top of the regulator housing to the valve. The pin is threaded to the valve so that rotation of the pin from outside the regulator causes vertical adjustment of the valve assembly. Because the float has an amount of horizontal travel along its arc, the width of the conventional regulator must be sized accordingly. Therefore, a regulator design is desirable which is compact and simple to adjust.

While conventional oil level regulators provide inflow of fluid when needed, such regulators do not provide an active signal indicating a seriously low oil condition. Such a low level condition could result where supply oil flow to the regulator is terminated or blocked or where a leak exists in the compressor crankcase. Known regulators have a sightglass which provides a visual indication of the actual oil level. However, such a sightglass indicator might go unnoticed in some environments. Therefore, it is desirable to provide an improved oil level regulator which reliably signals a low-oil condition with an active indicator. Accordingly, it is also desirable to terminate system operation below a certain critically low oil condition.

In a compressor system having an oil pump, oil loss can be detected by loss of oil pressure. However, certain compressor systems do not have an oil pump. In such systems, another means must be used to detect a low oil condition. It is therefore desirable to provide an improved regulator which is compatible with a such a pumpless compressor system.

SUMMARY OF THE INVENTION

The present invention overcomes the aforementioned problems and offers several advantages over prior art regulators. The regulator of the present invention utilizes responsive electro-mechanical components rather than conventional mechanical components. To this end, a liquid level regulator is provided having a chamber to contain liquid such as oil, a float which is buoyant relative to the liquid and a solenoid valve controlling an inlet flow of the liquid into the chamber. A switch is activatable by the float to actuate the solenoid valve at a first predetermined fluid level.

In an embodiment, the fluid level regulator also has a generally vertical tube on which the float is slidable.

In an embodiment, the fluid level regulator further includes a crossmember within the chamber through which the tube is slidable. A nut is threaded to the tube adjacent the crossmember to adjustably position an actuation level of the switch.

In an embodiment, the switch also actuates a signaling means at a second predetermined fluid level.

In an embodiment, the regulator is associated with a crankcase of a machine for which the switch terminates operation at a second predetermined fluid level.

In an embodiment, the switch is a magnetic reed switch.

In an embodiment, the regulator includes a capacitor between a relay of the solenoid valve and the switch to protect the switch.

In another embodiment, the regulator includes a resistor between a relay on the solenoid valve and the switch to protect the switch.

In an embodiment, the regulator includes a discharge tube generally positioned no higher than a lowest desired fluid point of an associated crankcase.

In an embodiment, the regulator includes a first discharge tube generally positioned at a desired operating fluid level of an associated crankcase and a second discharge tube generally positioned no higher than a lowest desired fluid level of an associated crankcase.

In an embodiment of the present invention, the regulator actuates an indicator, such as a light or an audible alarm, when a low-oil condition is present. In a related embodiment, the regulator terminates operation of the compressor at a critically low oil level in order to prevent damage from inadequate lubrication.

Therefore, it is an advantage of the present invention to provide an regulator which has improved response to correcting changes in oil level.

Another advantage of the present invention is to provide a regulator which is compact. The float required to buoyantly operate the switch in the present regulator is small relative to the float used in a prior art mechanical-valve regulator such as that in U.S. Pat. No. 4,428,208. Therefore, the housing and overall size can be compact in shape for the present invention.

A further advantage of the present invention is to provide a fluid level regulator which is adjustable to maintain a selected level of fluid, such as oil.

Yet another advantage is to provide a regulator which provides a warning indicator when a low-oil condition is present.

A still further advantage of the present invention is to provide a regulator which shuts down related machinery to prevent damage from lack of lubrication.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
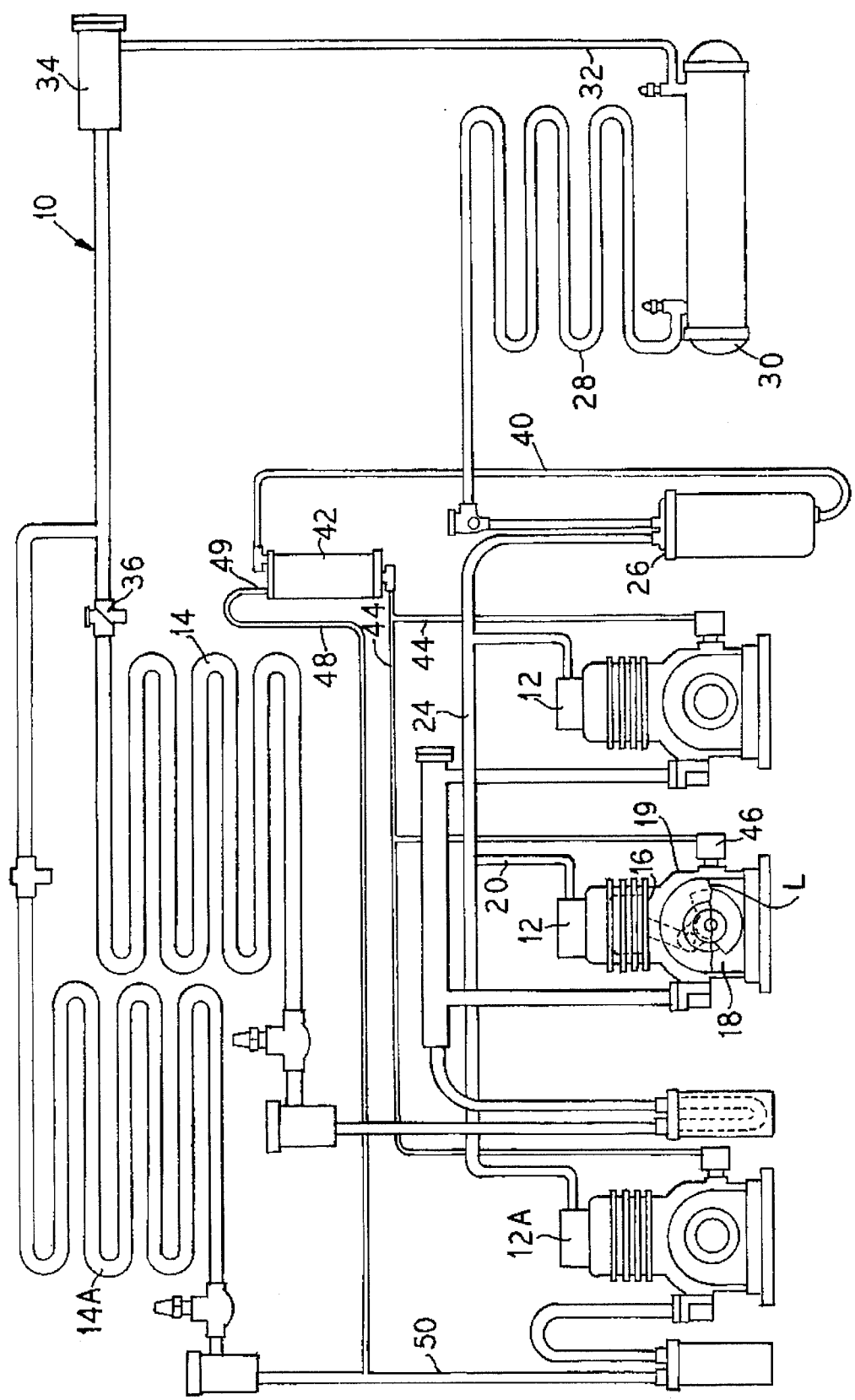
FIG. 1 illustrates a refrigeration system incorporating an oil level regulator embodying the principles of the present invention.

A standard refrigeration system 10 is illustrated in FIG. 1. As shown, one or more compressors 12 are used to compress a refrigerant gas after that gas has expanded in an evaporator 14. A system is possible which has only one compressor. Each compressor 12 has a reciprocating piston 16. Oil 18 is supplied to a crankcase 19 of the compressor 12 in order to lubricate moving components of the compressor 12 and to enhance sealing of the piston for efficient compressing.

During operation of the compressor 12, the oil becomes atomized and mixed with the refrigerant as the mixture leaves through an exit conduit 20. In an embodiment where there are multiple compressors in a parallel arrangement, as illustrated in FIG. 1, the mixture passes into a manifold 24 which communicates with additional compressors 12.

Oil is not a refrigerant, and the presence of oil in the refrigerant decreases the system efficiency. Therefore, an oil separator 26 is provided in the line between the compressor 12 and a condenser 28, to remove oil from the refrigerant gas. Refrigerant gas flowing into the condenser 28 is cooled, condensing into a liquid which is captured in a receiver 30. The cooled refrigerant liquid then flows through a conduit 32, through a filtered dryer 34 and through an expansion valve 36 to the evaporator 14. In the evaporator 14, the liquid refrigerant evaporates, absorbing heat energy. Consequently, an area associated with the evaporator is cooled. The refrigerant gas then flows through a conduit-38 to return to the compressors 12. More than one evaporator 14, 14A may be provided in an embodiment wherein one or more satellite compressors 12A are provided.

Oil removed from the refrigerant by the oil separator 26 is directed through a conduit 40 to an oil reservoir 42. From the reservoir 42, the oil is supplied through conduits 44 to the compressors 12. An oil level regulator 46 associated with each compressor 12 introduces a proper amount of oil to the corresponding compressor. The oil reservoir 42 is provided with a vent line 48 having a valve 49 to reduce the pressure within the oil reservoir to a level just slightly exceeding that present in a gas inlet line 50. This arrangement provides a slight positive pressure to ensure an adequate oil supply from the reservoir 42 to the oil level regulators 46.

The regulator 46 of the present invention controls the oil level in each crankcase 19 by means of a float operated valve (described in detail below in connection with FIGS. 2–7). When an adequate oil level L is present in the compressor crankcase, the regulator 46 closes oil flow from the conduit 44, providing no additional oil. However, when the oil level L drops below a desired level, the regulator 46 opens a flow of oil from the conduit 44 into the crankcase 19 until an adequate level L is restored. Oil from the oil reservoir 42 is thus returned into the crankcase 19.

Figure 3:
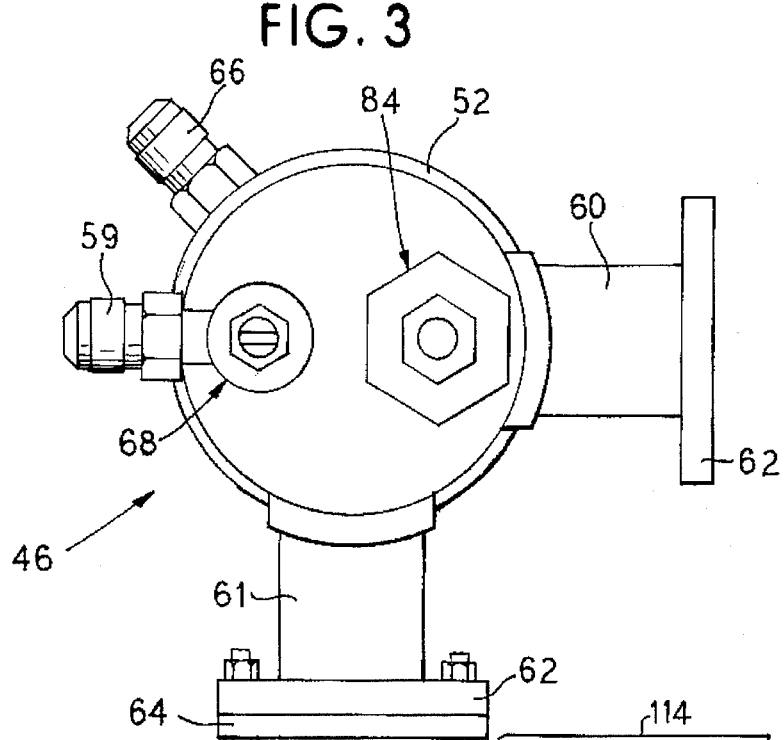
FIG. 3 illustrates a top plan view of the regulator of FIG. 2.
Figure 2:
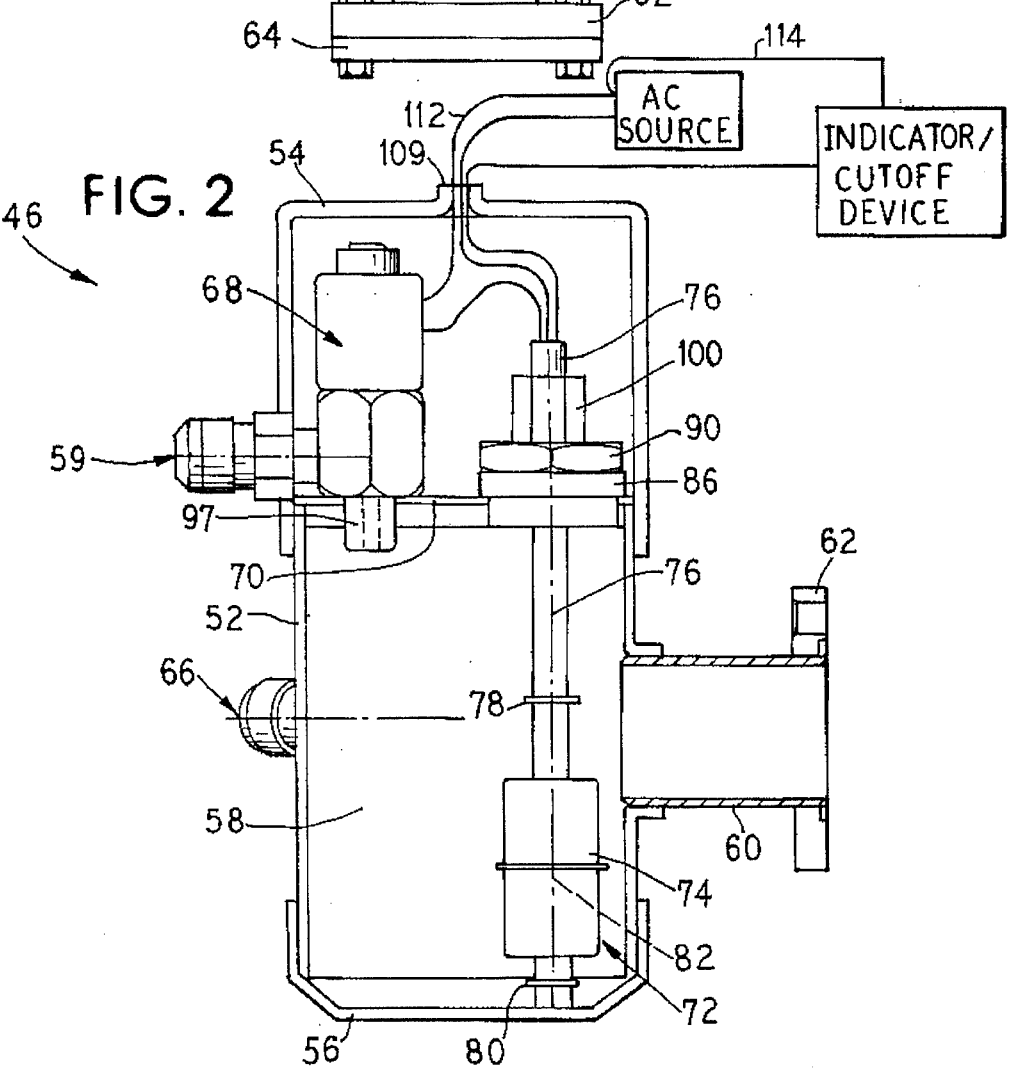
FIG. 2 illustrates a sectional side view of a regulator according to the present invention taken generally along line II—II of FIG. 3.

Turning to FIGS. 2 and 3, the regulator 46 is illustrated in greater detail. The regulator 46 preferably has a hollow cylindrical shell 52 which is closed at its ends by an upper end cap closure 54 and a lower end cap closure 56, defining a liquid containing chamber 58. The lower end cap 56 may be affixed to the shell 52 by any suitable means such as soldering or welding. The upper end cap closure 54 is preferably removable for adjusting the regulator, as explained below.

A pair of flanged discharge tubes 60, 61 extend from the shell 50, at approximately 90° to one another, providing communication from the chamber 58 to the compressor crankcase 19 (FIG. 1) through a selected one of the discharge tubes. The discharge tubes 60, 61 are affixed to the shell 52 by a suitable means, such as welding. In addition, each discharge tube includes a flange 62 at a free end thereof. A sight glass 63 may be secured to one of the flanges 62 not connected to the crankcase 19, and the sight glass 64 is also in communication with the chamber 58 and is positioned at a vertical height to enable the visual sighting of the oil level L (FIG. 1) in the chamber 58 from the exterior of the regulator 46. Such viewing allows an operator to monitor the oil level in the regulator 46 and associated crankcase 19 (FIG. 1) during normal system operation, indicating whether an adjustment of the oil level L is necessary, as described below. An equalization fitting 66 may also be provided in communication with the chamber 58 to optionally provide equalization of oil levels between multiple oil compressor crankcases as is known.

As shown in FIGS. 2 and 3, a solenoid valve 68 is disposed in the chamber 58. The solenoid valve 68 is normally closed and receives a supply flow of oil through an inlet fitting 59 which is connectable to the return conduit 44 (FIG. 1). In the embodiment illustrated, a crossplate 70 is secured to the interior of the shell 52 and is disposed across the chamber 58 above the discharge tubes 60, 61. The solenoid valve 68 is mounted to the crossplate 70.

Figures 4, 5:
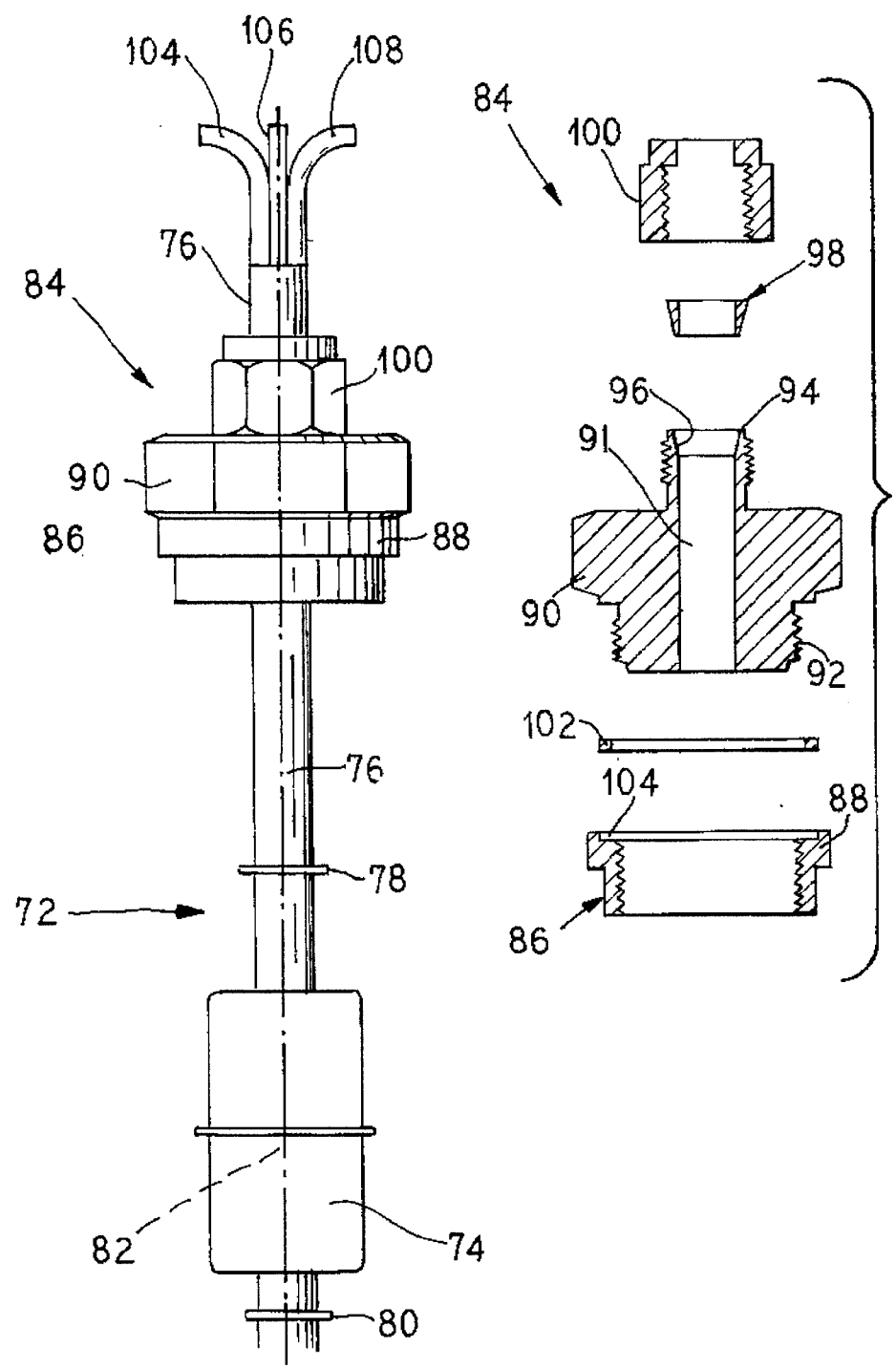
FIG. 4 illustrates a side elevational view of the float switch assembly of the embodiment illustrated in FIG. 2.
FIG. 5 illustrates an exploded sectional view of the compression fitting for adjustably retaining the float switch.
Figure 6:
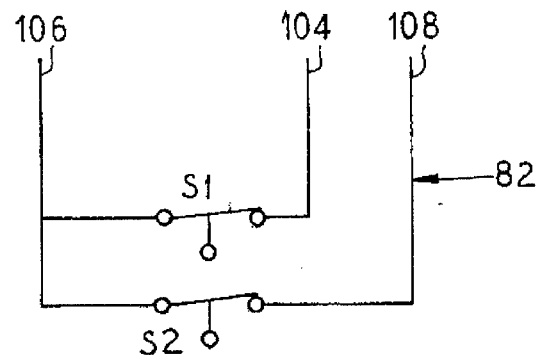
FIG. 6 illustrates a schematic of a double-contact switch used to actuate the solenoid and the signaling means.

Referring to FIG. 4, a float switch assembly 72 is provided. In the illustrated embodiment, the float switch assembly 72 includes a cylindrical float 74 which is slidably disposed around a tube 76. The tube 76 has an upper annular ring 78 and a lower annular ring 80 which define respective upper and lower limits of slidable float 74 motion along the tube 76. A switch 82 as illustrated in FIG. 6 is disposed internally within the tube 76 and is operably actuated by motion of the float 74, as described in greater detail below. The switch 82 can be a magnetic reed type switch. In such an embodiment, a magnet is carried in the float 74 to actuate the reeds.

FIGS. 4 and 5 also illustrate a compression fitting 84 which is provided for adjustably retaining the float switch assembly 72. Particularly, the compression fitting 84 retains the tube 76 in a slidably adjustable manner. The compression fitting 84 is retained by a mounting ring 86. The mounting ring 86 is annular in shape and has an enlarged-diameter ridge 88. The mounting ring 86 fits into a hole in the crossplate 70 so that the ridge 88 abuts the crossplate 70. The mounting ring 86 is then secured to the crossplate 70 by a suitable means such as brazing. The mounting ring 86 has an interiorly threaded surface which forms a female threaded connection to a threaded connector 90.

The threaded connector 90 has a cylindrical bore 91 (FIG. 5) through which the tube 76 slidably fits. A lower male threaded portion 92 of the threaded connector 90 is threadably connectable to the mounting ring 86. An upper male threaded portion 94 extends upwardly. The upper threaded portion 94 has an interiorly bevelled surface 96. The bevelled surface 96 cooperatively receives a ferrule 98 made of a compressible material which fits closely around the tube 76. A compression nut 100 is threaded onto the upper threaded portion 94.

The threaded connector 90 is threadable into the mounting ring 86 in a secure manner. An annular gasket 102 is preferably disposed in a recess 104 of the mounting ring 86 to seal between the mounting ring 86 and the chamber 58. The mounting ring 86 is preferably sized so that the float 74 can pass therethrough. Thus, the float switch assembly 72 and compression fitting 84 can easily be removed by unscrewing the connector 90 and lifting the assembly from the chamber 58. This is desirable for easy installation or replacement of the switch assembly 72.

Turning back to FIG. 2, when the connector 90 is secured in the mounting ring 86, the tube 76 is held in a generally vertical position so that the float 74 and float switch 82 are disposed in a lower part of the chamber 58. Tightening the compression nut 100 forces the ferrule 98 downward against the bevelled surface 96, squeezing the ferrule 98 against the tube 76, gripping the tube 76 in a desired position. The nut 100 can be loosened so that the tube 76 can be moved up or down to adjust the fluid level where the switch 82 is actuated. Visual markings can be provided on an upper end of tube 76 to indicate various positions of the tube 76 and thus actuation points for the switch 82.

The switch 82 is operable to activate the solenoid valve 68. Wires 104, 106, and 108 which extend through a grommet 109 and into the top of the tube 76, as shown in FIG. 2, are connected to the switch 82. The wire 104 carries a signal from the switch 82 to the solenoid of the solenoid valve 68. The wires 104, 106, and 108 are described in greater detail below in connection with FIGS. 5 and 6.

Still referring to FIG. 2, the float 74 is buoyant relative to the oil, and is slidable up and down on the tube 76 in response to the oil level in the chamber 58. When the oil level drops below a desired crankcase operating level, the float 74 actuates the switch 82. The switch 82 activates the solenoid valve 68 to open, allowing an inflow of oil through an inlet 97 into the chamber 58 until the desired level is restored. The float 74 moves upward with the rising oil level until the switch 82 is disengaged, closing solenoid valve 68.

Turning now to FIG. 6, the switch 82 preferably has dual contacts and is actuated at two different levels. A first set of contacts S1 is arranged to close when the float 74 is at an upper actuation level-the level previously described, corresponding to the level below which the solenoid valve 68 is opened. In the optional embodiment, a second set of contacts S2 is also provided in the switch, S2 being arranged to close at a second, lower level corresponding to a seriously low oil level in the associated crankcase.

Figure 7:
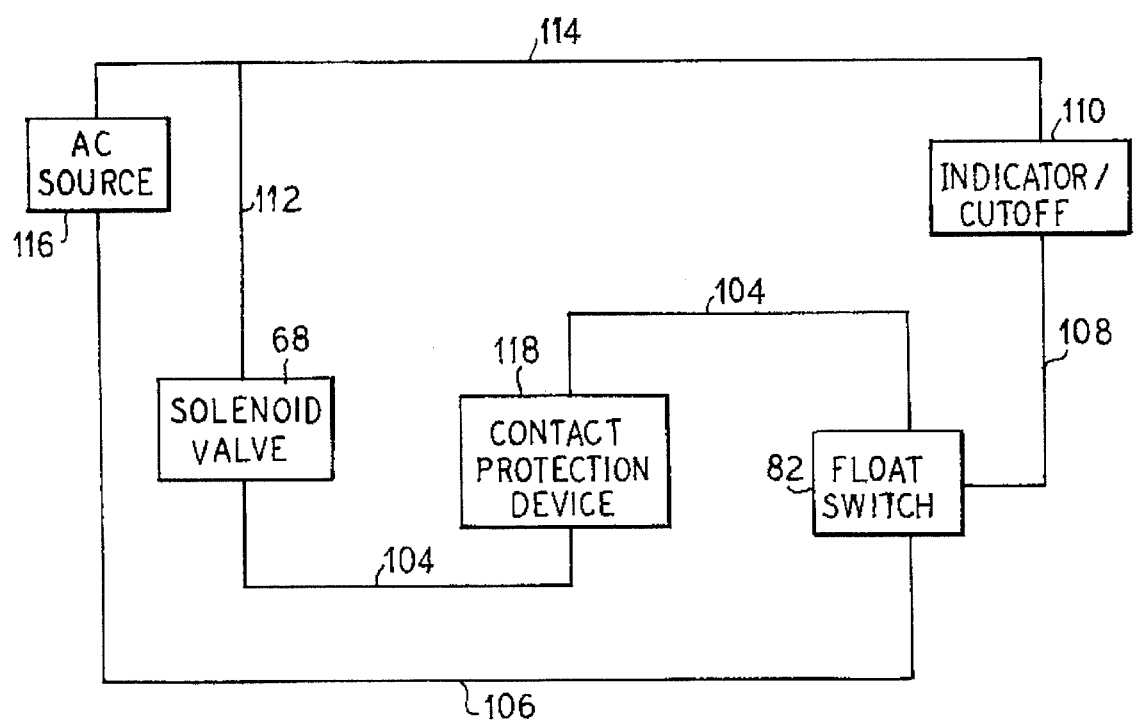
FIG. 7 illustrates a schematic of the circuit actuated by the float switch.

When the oil level drops to the lower level, the contacts S2 close to activate an indicator or cutoff device 110 (FIGS. 2 and 7). The indicator can be a light or an audible alarm, or both. The warning signal triggered at this lower switching level can also be used to terminate operation of the associated crankcase to protect against damage from lack of lubrication. In such an embodiment, the switch preferably triggers the indicator or cutoff signal at approximately ⅛ inch below the desired operating oil level of the compressor.

A wire 112 which leads to the solenoid, a wire 114 which leads to the indicator/cutoff device 110 and the wire 106 illustrated in FIG. 2 are connected to an AC power supply 116. The wires 104 and 108 lead from the switch 82 to the solenoid valve 68, and the indicator 110, respectively. The power supply 116 can be an AC power source located externally to the regulator 46. Thus, the power wires 106, 108 and 112 extend through the grommet 109 at the upper end cap closure 54. The wires 104, 106, and 108 extend down the tube 76 to the switch 82.

As FIG. 6 illustrates, the wire 106 delivers a common power supply connected to one side of both contacts S1 and S2. The first set of contacts S1 connects the power wire 106 to the solenoid wire 104. The second set of contacts S2 connects the power wire 106 to the indicator/cutoff wire 108. The wire 108 carries the warning signal triggered by the second contacts S2 to the indicator or cutoff device 110.

FIG. 7 illustrates a preferred circuit of the regulator 46 including the float switch 82. The solenoid valve 68 gives off an inductive magnetic field when it shuts on and off. Without a contact protection device 118 in the wire 104, the inductive load upon de-energization of the solenoid can result in a chatter of the switch reeds, causing damage such as a welding of the reeds. Therefore, a contact protection device 118 is preferably arranged between the solenoid valve 68 and the switch 82. The contact protection device 118 can be, for example, varistor or a relay.

Figure 8:
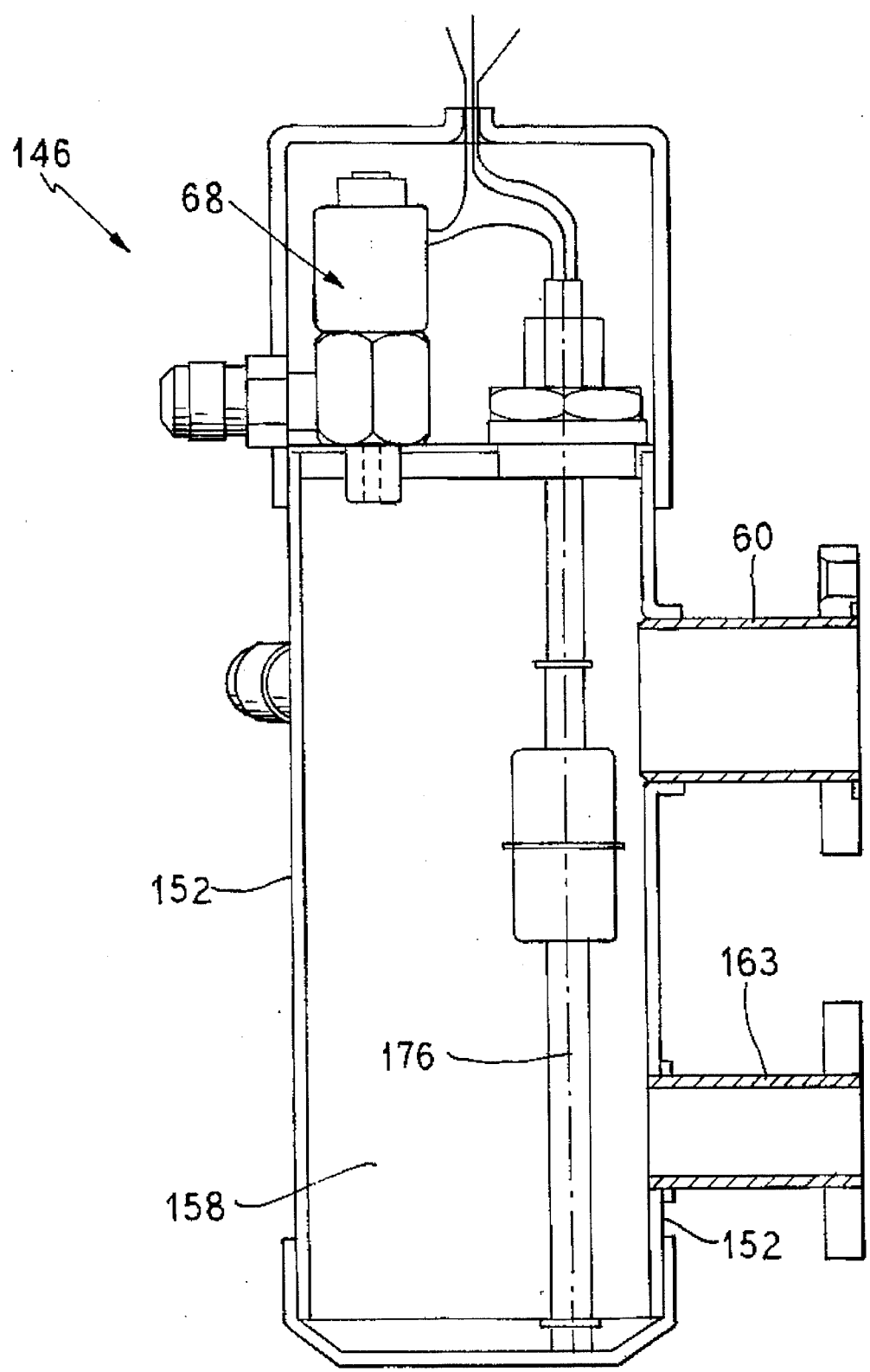
FIG. 8 illustrates a sectional side view of another embodiment of the present invention including a lower discharge tube.

FIG. 8 illustrates a sectional side view of an alternative embodiment of the present invention including a regulator 146 which can be used in a compressor system having no oil pump or with a compressor operable at a wide range of oil levels. In this embodiment, the regulator 146 has a shell 152 which is elongated, defining a chamber 158 which extends to a lower level than in the above described regulator 46. The regulator 146 also has a discharge tube 60 arranged generally at the desired operating oil level of the compressor. However, the regulator 146 further includes a lower discharge tube 163 providing communication between the chamber 158 and the crankcase 19. The lower discharge tube 163 is generally at the lowest compressor operating oil level-the level below which the indicator signal actuates an indicator or cutoff device. The distance between solenoid and indicator/cutoff switching is longer in this embodiment. Therefore, the float 74 slides along a longer tube 176. If two sets of switch contacts are used, as shown in FIG. 6, the upper set would be associated with the level of the upper discharge tube 60 while the lower set would be associated with the lower discharge tube 163.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A liquid level regulator comprising:

a chamber to contain liquid;

a float which is buoyant relative to said liquid;

a solenoid valve controlling an inlet flow of said liquid into the chamber;

a switch activatable by said float to actuate said solenoid valve at a first predetermined fluid level;

a generally vertical tube on which said float is slidable;

a crossplate within said chamber; and a compression fitting mounted in said crossplate, said compression fitting adjustably retaining said tube to allow said switch to be adjustably positioned within said chamber.

2. The liquid level regulator according to claim 1, including an indicator, wherein said switch also actuates said indicator at a second predetermined fluid level.

3. The liquid level regulator according to claim i wherein said regulator is associated with a machine and a cutoff device is connected to said machine to terminate operation of said machine upon actuation of said cutoff device and wherein said switch actuates said cutoff device at a second predetermined fluid level.

4. The liquid level regulator according to claim 1 wherein said switch is a magnetic reed switch.

5. The liquid level regulator according to claim 1 further comprising:
a relay between said solenoid valve and said switch to protect said switch.

6. The liquid level regulator according to claim 1 further comprising:
a varistor between said solenoid valve and said switch to protect said switch.

7. The liquid level regulator according to claim 1, said regulator being connectable to a crankcase, said regulator further comprising:
a discharge tube generally positioned no higher than a lowest desired fluid point of said crankcase.

8. The liquid level regulator according to claim 1, said regulator being connectable to a crankcase, said regulator further comprising:
a first discharge tube generally positioned at an upper desired operating fluid level of said crankcase; and
a second discharge tube generally positioned no higher than a lowest desired fluid level of said crankcase.

9. The liquid level regulator according to claim 1, wherein said compression fitting comprises:
an annular mounting ring secured to said crossplate;
a threaded connector which is threadably connectable to the mounting ring, the threaded connector having an upwardly-extending male portion and a central bore extending therethrough, the male portion having an opening with an interiorly beveled surface, the tube extending through said central bore;
an annular ferrule fitted around the tube and which is received against said beveled surface; and
a compression nut threadably securable onto the male portion, the compression nut pressing the ferrule against the beveled surface.

10. The liquid level regulator according to claim 9, wherein said annular ferrule is compressible.

11. An oil level regulator comprising:
a body with a hollow interior for receiving oil;
an inlet into said interior of said body;
an outlet from said interior of said body;
a float positioned within said interior to be acted upon by oil within said interior so as to cause said float to change vertical position in response to an oil level within said interior;
a switch actuated by movement of said float to a predetermined level;

a vertical tube provided in said interior, said float being guided on said tube and said switch being positioned within said tube;
a tube adjustment mechanism to provide vertical adjustability of said tube corresponding to said predetermined level; and
a valve controlled by said switch and associated with said inlet to admit oil to said interior when said switch is actuated.

12. An oil level regulator according to claim 11, wherein said switch is a magnetic reed switch.

13. An oil level regulator according to claim 11, wherein said valve is a solenoid valve.

14. An oil level regulator according to claim 11, wherein a contact protection device is positioned between said valve and said switch.

15. An oil level regulator according to claim 11, wherein said switch is also actuated by movement of said float to a second predetermined level and an indicator device is provided which is controlled by said switch when said switch is actuated at said second predetermined level.

16. An oil level regulator according to claim 15, wherein said body has a first outlet and a second outlet, said second outlet being located at a different vertical position than said first outlet, and said first predetermined level is associated with a level of said first outlet and said second predetermined level is associated with a level of said second outlet.

17. An oil level regulator comprising:
a body with a hollow interior for receiving oil;
an inlet into said interior of said body;
an outlet from said interior of said body;
a vertical tube positioned in said interior;
a float carried on said vertical tube within said interior to be acted upon by oil within said interior so as to cause said float to change vertical position in response to an oil level within said interior;
a switch positioned within said tube and actuated by movement of said float to a predetermined level;
an adjustment mechanism for said tube to provide vertical adjustability to said predetermined level;
a solenoid valve controlled by said switch and associated with said inlet to admit oil to said interior when said switch is actuated; and
a crossplate in said interior to which said adjustment mechanism is removably mounted.

18. An oil level regulator according to claim 17, wherein said switch is also actuated by movement of said float to a second predetermined level and an indicator device is provided which is controlled by said switch when said switch is actuated at said second predetermined level.

19. An oil level regulator according to claim 18, wherein said body has a first outlet and a second outlet, said second outlet being located at a different vertical position than said first outlet, and said first predetermined level is associated with a level of said first outlet and said second predetermined level is associated with a level of said second outlet.

* * * * *